United States Patent
Rizzo, Jr.

(10) Patent No.: US 10,675,697 B2
(45) Date of Patent: Jun. 9, 2020

(54) METHOD FOR CREATING AIRFOIL LEADING AND TRAILING EDGES

(71) Applicant: United Technologies Corporation, Hartford, CT (US)

(72) Inventor: John P. Rizzo, Jr., Vernon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 461 days.

(21) Appl. No.: 15/022,571

(22) PCT Filed: Sep. 24, 2014

(86) PCT No.: PCT/US2014/057174
§ 371 (c)(1),
(2) Date: Mar. 17, 2016

(87) PCT Pub. No.: WO2015/060975
PCT Pub. Date: Apr. 30, 2015

(65) Prior Publication Data
US 2016/0221096 A1    Aug. 4, 2016

Related U.S. Application Data

(60) Provisional application No. 61/895,035, filed on Oct. 24, 2013.

(51) Int. Cl.
*C25D 7/00* (2006.01)
*B23H 9/10* (2006.01)
*B23H 7/38* (2006.01)
*B23H 3/04* (2006.01)

(52) U.S. Cl.
CPC .................. *B23H 9/10* (2013.01); *B23H 3/04* (2013.01); *B23H 7/38* (2013.01); *C25D 7/00* (2013.01)

(58) Field of Classification Search
None
See application file for complete search history.

(56) References Cited

U.S. PATENT DOCUMENTS

| | | | |
|---|---|---|---|
| 3,514,390 A | 5/1970 | Stark et al. |
| 5,256,262 A | 10/1993 | Blomsterberg |
| 5,985,127 A | 11/1999 | Greenslade |
| 9,682,437 B2 | 6/2017 | Platz et al. |
| 2010/0051475 A1 | 3/2010 | Eto, II et al. |
| 2011/0262771 A1 | 10/2011 | Trimmer et al. |
| 2011/0290663 A1 | 12/2011 | Luo et al. |

FOREIGN PATENT DOCUMENTS

| | | |
|---|---|---|
| DE | 69601849 T2 | 9/1999 |
| JP | 02243800 | 9/1990 |

OTHER PUBLICATIONS

International Preliminary Report on Patentability for International Application No. PCT/US2014/057174 dated May 6, 2016.
International Search Report from corresponding PCT/US14/57174.
Supplementary European Search Report for European Application No. 14856563.3 dated Jul. 10, 2017.

*Primary Examiner* — Stefanie S Wittenberg
(74) *Attorney, Agent, or Firm* — Carlson, Gaskey & Olds, P.C.

(57) ABSTRACT

A method of forming a component using electro-chemical machining includes the steps of providing a shield in a current distribution path between a workpiece and an electrode, with the shield concentrating current distribution upon an end of the workpiece.

4 Claims, 2 Drawing Sheets

METHOD FOR CREATING AIRFOIL LEADING AND TRAILING EDGES

CROSS-REFERENCE TO RELATED APPLICATION

This application claims priority to U.S. Provisional Application No. 61/895,035, filed Oct. 24, 2013.

BACKGROUND OF THE INVENTION

This application relates to a method of using a non-contact machining method, such as electro-chemical machining (ECM) or electrolytic machining to form airfoil leading and trailing edges.

Airfoils are utilized in any number of applications. As an example, a gas turbine engine commonly has airfoils associated with a number of rotating blades and a number of static vanes. A number of methods of manufacture are utilized to form the airfoils.

Typically, an airfoil could be said to have a pressure side, a suction side, a leading edge and a trailing edge. Optimal edge shapes often include complex curves, such as spline, parabolas or ellipses.

One popular method of manufacturing airfoils is electro-chemical machining (ECM).

In a common ECM system, a conductive workpiece is machined to form the airfoil. A voltage is connected to the workpiece and to an electrode (cathode). The workpiece is in a chamber with an electrolytic fluid. Precision ECM systems use complex cathode shapes that are place in close proximity to the workpiece to create complex geometry. This technique is expensive and results in long lead time tooling.

Metal is removed from the workpiece and complex shapes may be formed. However, as mentioned above, the leading and trailing edges, and in particular, very small sized edges, challenge traditional precision ECM methods. These methods have not been as effective in forming the desired edges.

SUMMARY OF THE INVENTION

In a featured embodiment, a method of forming a component using electro-chemical machining includes the steps of providing a shield in a current distribution path between a workpiece and an electrode, with the shield concentrating current distribution upon an end of the workpiece.

In another embodiment according to the previous embodiment, the workpiece is to form an airfoil, and the shield concentrating current distribution upon the end of the workpiece is to form at least one of a leading edge and a trailing edge of the airfoil.

In another embodiment according to any of the previous embodiments, the shield is utilized to concentrate the current distribution on both the leading edge and the trailing edge.

In another embodiment according to any of the previous embodiments, the shield includes two parallel shields that are spaced on sides of the workpiece.

In another embodiment according to any of the previous embodiments, ends of the parallel shields deflect current at the one end of the workpiece.

In another embodiment according to any of the previous embodiments, the shield sits between the end of the workpiece and the electrode and includes an aperture for concentrating the current distribution on the one end of the workpiece.

In another embodiment according to any of the previous embodiments, the shield is formed of non-conductive material.

In another embodiment according to any of the previous embodiments, the shield is formed of a plastic.

In another embodiment according to any of the previous embodiments, electro-chemical machining is also utilized to form the workpiece to an intermediate shape prior to using the shield to form the one of the leading and trailing edges.

In another embodiment according to any of the previous embodiments, the shield comprises a pair of parallel spaced shields on sides of the workpiece.

In another embodiment according to any of the previous embodiments, ends of the parallel shields deflect current at the one end of the workpiece.

In another embodiment according to any of the previous embodiments, the shields are formed of non-conductive material.

In another embodiment according to any of the previous embodiments, the shields are formed of a plastic.

In another embodiment according to any of the previous embodiments, the shields are formed of non-conductive material.

In another embodiment according to any of the previous embodiments, the shields are formed of a plastic.

In another embodiment according to any of the previous embodiments, the shield sits between the end of the workpiece. The electrode and the shield include an aperture for concentrating the current distribution on the one end of the workpiece.

In another embodiment according to any of the previous embodiments, the shield is formed of non-conductive material.

In another embodiment according to any of the previous embodiments, the shield is formed of a plastic.

In another embodiment according to any of the previous embodiments, the shield is formed of non-conductive material.

In another embodiment according to any of the previous embodiments, the shield is formed of a plastic.

In another embodiment according to any of the previous embodiments,

These and other features may be best understood from the following drawings and specification.

DETAILED DESCRIPTION

As shown, an airfoil 20, which may be part of a blade, vane or other item within a gas turbine engine, has a curved shape along a central area 22 and extending between a trailing edge 24 and a leading edge 26.

More generally, components may include blades, vanes, tangential outboard injectors, integrally bladed rotors, and impellers. In fact, teachings of this application may even extend to components that do not include an airfoil, but which do require some complex shaping. As can be appreciated from FIG. 1, the trailing edge 24 and the leading edge 26 are curved.

Figure 2A:
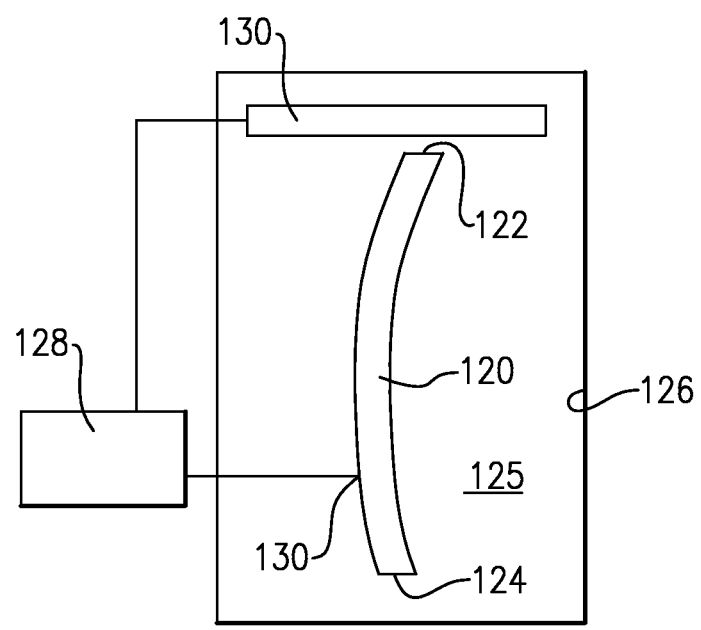
FIG. 2A shows a first method step.

FIG. 2A shows an electro-chemical machining process 126 schematically. As known, an electrolytic fluid 125 fills a chamber. This fluid may be driven through the chamber with forced or passive current streams. A preform or workpiece 120, which is to form the airfoil 20, is placed within the chamber. The workpiece 120 is formed of a conductive material, such as an appropriate metal. An end 122 is to form the leading edge while an end 124 is to form the trailing edge. An electrode 130 functions as a cathode. A voltage source 128 applies a charge between cathode 130 and the workpiece 120, which functions as an anode. As known, material may be removed from the workpiece 120 by this process.

Figure 2B:
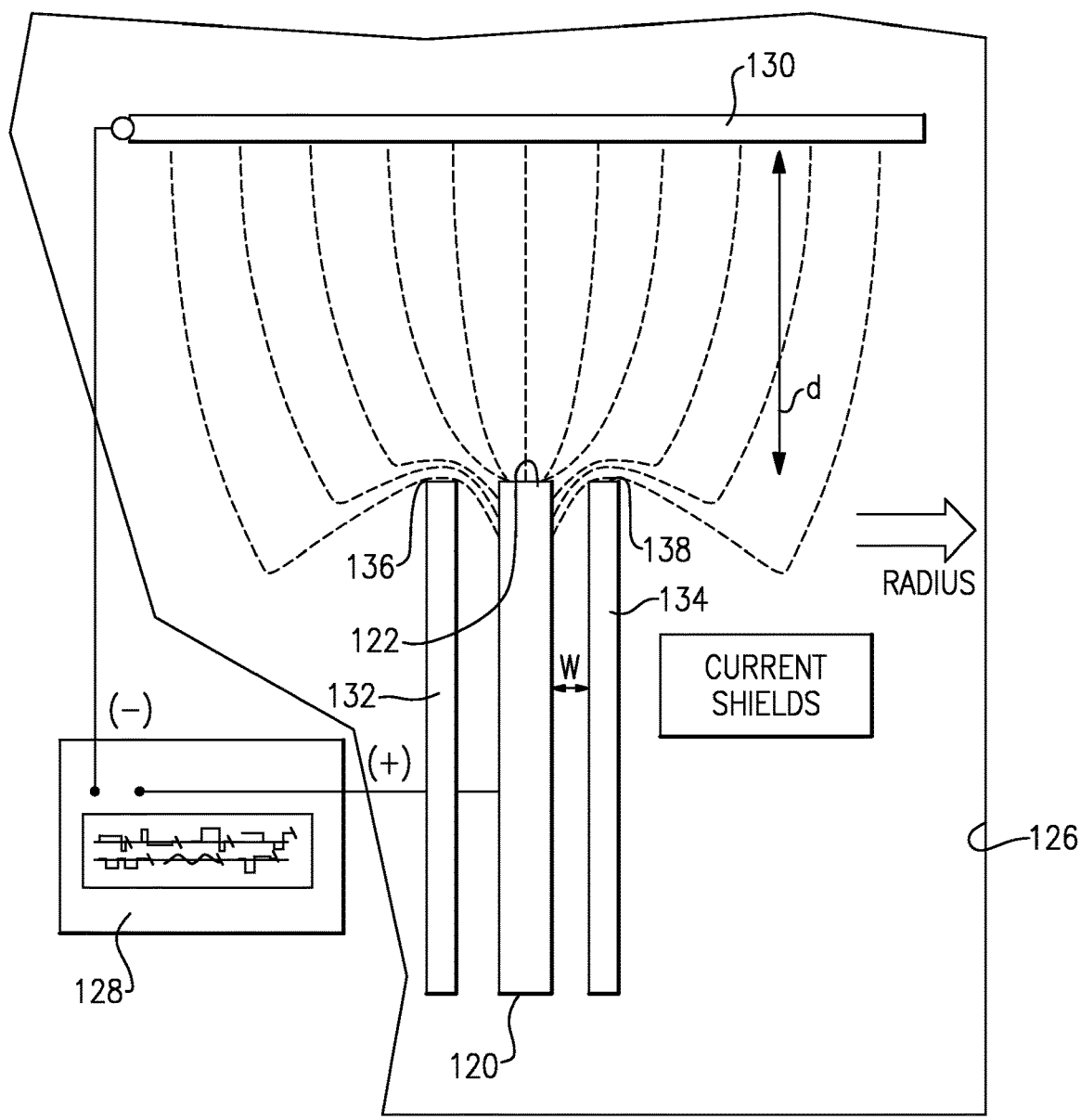
FIG. 2B shows a subsequent method step.

Once a general or intermediate shape of the final airfoil is achieved by the method of FIG. 2A, then a finish step, as shown in FIG. 2B, is performed. On the other hand, the initial work, as shown in FIG. 2A, to bring the workpiece 120 to the intermediate shape may be done by other processes beyond electro-chemical machining.

Figure 1:
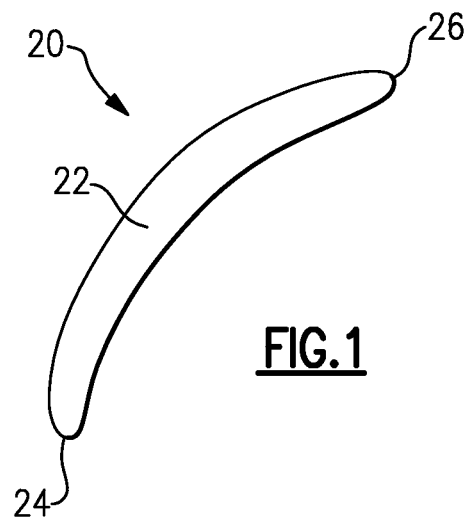
FIG. 1 schematically shows an airfoil.

As shown in FIG. 2B, in the finish process, shields 132 and 134 are placed on each side of the workpiece 120. The end 122, which is to form the leading edge 26, is spaced between the shields 132 and 134. A current, which passes between the cathode 130 and the workpiece 120, is deflected around ends 136 and 138 of the shields 132 and 123 and, thus, concentrated at the end 122 of the workpiece 120. In this manner, a curve leading edge 26, such as shown in FIG. 1, is formed.

While the method is shown as two separate steps, in practice, automation techniques may be utilized to have the two happen serially, without any significant down time between the two steps.

A worker of ordinary skill in this art would recognize that by controlling a distance W between the workpiece 120 and the shields 132 and 134 and a distance d between the end 122 and the cathode 130, the extent and shape of the leading edge to be formed can be controlled.

Figure 3:
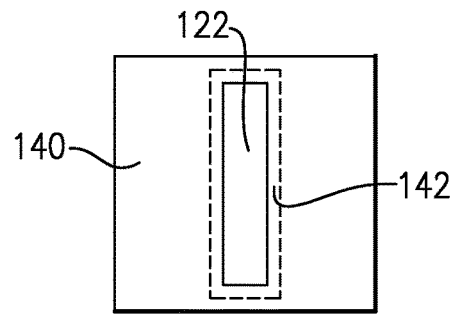
FIG. 3 shows an alternative method.

FIG. 3 shows an alternative shield 140, which is not placed parallel to a second shield. Rather, it sits between the end of workpiece 120 and the electrode 130. Shield 140 has a slot or aperture 142 aligned with the end 122 of the workpiece 120, which is to form the leading edge. With this embodiment, the current will again be concentrated at the end 122 to form a leading edge 26.

Generically, the two embodiments could both be said to include the provision of a shield in a current distribution path to concentrate the current distribution on an end of a workpiece.

The trailing edge is formed in a similar manner.

The shields 132, 134 and 140 are all formed of an appropriate material which is generally non-conductive. As an example, an insulator, such as a plastic, may be utilized.

In the FIG. 2B embodiment, the shields 132 and 134 may be parallel.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method of forming a component using electro-chemical machining comprising the steps of:
    providing a shield in a current distribution path between a workpiece and an electrode, with said shield concentrating current distribution upon at least one end of the workpiece;
    wherein said shield includes two parallel shields that are spaced on sides of said workpiece;
    wherein ends of said parallel shields deflect current at said at least one end of said workpiece; and
    providing a current passing between said electrode and said workpiece, with said current being deflected around ends of each of said shields, and concentrated upon said at least one end of said workpiece, with said at least one end of said workpiece being one of a leading and trailing edge of an airfoil.

2. The method as set forth in claim 1, wherein said shield is formed of non-conductive material.

3. The method as set forth in claim 2, wherein said shield is formed of a plastic.

4. The method as set forth in claim 1, wherein electro-chemical machining is also utilized to form the workpiece to an intermediate shape prior to the use of the shield to form said one of said leading and trailing edges.

\* \* \* \* \*